(12) United States Patent
Hirudayaraj et al.

(10) Patent No.: US 10,051,531 B2
(45) Date of Patent: *Aug. 14, 2018

(54) CONTEXT-AWARE WIRELESS ROAMING

(71) Applicant: FIRETIDE, INC., Campbell, CA (US)

(72) Inventors: Sudhir Hirudayaraj, Cupertino, CA (US); Krishna Belathur Srinivasa Prasad, Bangalore (IN)

(73) Assignee: Firetide, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/455,026

(22) Filed: Mar. 9, 2017

(65) Prior Publication Data

US 2017/0303172 A1   Oct. 19, 2017

Related U.S. Application Data

(63) Continuation of application No. 14/438,526, filed as application No. PCT/IB2013/059869 on Nov. 3, 2013, now Pat. No. 9,596,632.

(30) Foreign Application Priority Data

Nov. 6, 2012   (IN) .......................... 3427/DEL/2012

(51) Int. Cl.
*H04W 36/00* (2009.01)
*H04W 8/02* (2009.01)
*H04W 84/00* (2009.01)

(52) U.S. Cl.
CPC ......... *H04W 36/0083* (2013.01); *H04W 8/02* (2013.01); *H04W 84/005* (2013.01)

(58) Field of Classification Search
CPC .. H04W 36/0083; H04W 84/005; H04W 8/02
See application file for complete search history.

(56) References Cited

U.S. PATENT DOCUMENTS 9,596,632 B2 *  3/2017  Hirudayaraj ...... H04W 36/0083
2003/0036374 A1   2/2003  English et al.
(Continued)

FOREIGN PATENT DOCUMENTS

CN   101867989 A   10/2010
GB   2464480 A    4/2010
(Continued)

OTHER PUBLICATIONS

Xue Yongxu, The State Intellectual Property Office of the People's Republic of China, Notification of the First Office Action for Application No. 2013800694228, dated Nov. 13, 2017, 16 pages.
(Continued)

*Primary Examiner* — Kashif Siddiqui
(74) *Attorney, Agent, or Firm* — PatentVentures; Bennett Smith; Korbin Van Dyke

(57) ABSTRACT

A wireless network infrastructure, comprising static and roaming mobile nodes (including one or more types of access-points), avoids unnecessary handoffs and unstable RF regions, and enables at least selected context-aware-capable mobile nodes to provide context-aware services to connected clients. More particularly, each of at least selected static nodes is enabled to provide the context-aware-capable mobile nodes with context information regarding the static node's relative position and direction, details of information served by the static node, special flags indicative of relevant impending changes in the foregoing parameters, and a range of signal strength values defining a stable RF zone for associated mobile nodes. Each context-aware-capable mobile node accordingly creates a context map that at least in part enables determination of the mobile node's next change in static node association and the preferred timing for the change.

20 Claims, 5 Drawing Sheets

(56) References Cited

U.S. PATENT DOCUMENTS

| | | | |
|---|---|---|---|
| 2004/0121772 A1* | 6/2004 | Rue | H04L 63/08 455/436 |
| 2005/0255856 A1 | 11/2005 | Griffin et al. | |
| 2005/0271021 A1* | 12/2005 | Alemany | H04W 48/20 370/338 |
| 2005/0288021 A1* | 12/2005 | Hunkeler | H04W 48/10 455/436 |
| 2009/0003279 A1* | 1/2009 | Abusch-Magder | H04W 36/0083 370/331 |
| 2009/0005052 A1* | 1/2009 | Abusch-Magder | H04W 24/02 455/446 |
| 2009/0122760 A1 | 5/2009 | Kim et al. | |
| 2011/0039520 A1* | 2/2011 | Maida | H04W 36/0083 455/411 |

FOREIGN PATENT DOCUMENTS

| | | |
|---|---|---|
| JP | 2002145069 | 5/2002 |
| JP | 2005012633 | 1/2005 |
| JP | 2006050366 | 2/2006 |
| JP | 2007082075 | 3/2007 |
| JP | 2010011010 | 1/2010 |
| JP | 2011160398 | 8/2011 |
| WO | 2014/072894 | 5/2014 |

OTHER PUBLICATIONS

Yusuke Aizawa, Notice of Reasons for Refusal for Japanese Patent Application No. 2015-541270, dated Nov. 7, 2017, 10 pages.
Office Action of the Intellectual Property Office, ROC (Taiwan) Patent Application No. 102140323, (now allowed) Issuance Date Apr. 28, 2017, 13 pages.
Jan. 30, 2018 List of References Used in Art Rejections, Jan. 30, 2018, 1 page.
Notification of Transmittal of the International Search Report and the Written Opinion Df the International Searching Authority, or the Declaration, PCT/IB2013/059869, dated Feb. 27, 2014, 11 pages, Korean Intellectual Propety Office.

* cited by examiner

CONTEXT-AWARE WIRELESS ROAMING

CROSS REFERENCE TO RELATED APPLICATIONS

Priority/benefit claims for this application are made in the accompanying Application Data Sheet. This application incorporates by reference for all purposes the following applications:

India Provisional Patent Application (Serial No. 3427/DEL/2012), filed Nov. 6, 2012, first named inventor Sudhir HIRUDAYARAJ, and entitled CONTEXT-AWARE WIRELESS ROAMING.

PCT Application (Serial No. PCT/IB2013/059869), filed Nov. 3, 2013, first named inventor Sudhir HIRUDAYARAJ, and entitled CONTEXT-AWARE WIRELESS ROAMING.

U.S. Pat. No. 9,596,632 (Ser. No. 14/438,526), filed Apr. 24, 2015, first named inventor Sudhir HIRUDAYARAJ, and entitled CONTEXT-AWARE WIRELESS ROAMING.

BACKGROUND

Field

Advancements in wireless roaming in wireless mesh networks are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

A generic wireless infrastructure to support roaming of mobile units, each of which is responsible for switching traffic between clients connected to the mobile units and those connected to the fixed backbone network, generally is subjected to one or more of the following problems:

1. Unpredictable handoff patterns: mobile units can roam from any access-point (AP) to another, purely based on instantaneous signal strength values, resulting in unpredictable changes in RF conditions which leads to unpredictable changes in data rates.
2. Unnecessary handoffs: Each handoff from one access-point to another carries with it a penalty both in terms of additional computation because of tearing down and establishment of links and in re routing of traffic through the new access-point and any accompanying losses. A traditional wireless infrastructure does nothing to minimize these handoffs.
3. Ping pong effect: A phenomenon related to the above mentioned problem of unnecessary handoffs often occurs when a mobile unit decides to roam to a particular access-point purely based upon the signal strength seen from it, only to find itself roaming back to its previous attachment in a very short span of time, due to bad or unstable RF conditions. This typically happens when the mobile unit decides to roam either too early or too late to the next access-point.
4. Attachment in unstable RF zones: overlapping odd numbered Fresnel zones and other RF phenomena can result in unstable RF zones wherein, even when the signal strengths are very high, data traffic may suffer from packet losses and fluctuations in throughput. For example, the region immediately around the antenna of any wireless unit is an unstable region with unpredictable RF characteristics, which are bound to change drastically as soon as the mobile unit crosses the antenna. If a mobile unit decides to roam to an access-point in such a region, its traffic will automatically suffer.

Thus, improvements in wireless infrastructure to better support the roaming of mobile units, and minimize or avoid the above problems, are desired.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

A wireless network infrastructure, comprising static and roaming mobile nodes (including one or more types of access-points), avoids unnecessary handoffs and unstable RF regions, and enables at least selected context-aware-capable mobile nodes to provide context-aware services to connected clients. More particularly, each of at least selected static nodes is enabled to provide mobile nodes capable of context-awareness with context information regarding the static node's relative position and direction, details of information served by the static node, special flags indicative of relevant impending changes in the foregoing parameters (for example, an upcoming change in direction, such as occurring at an end-of-line terminal), and a range of signal strength values defining a stable RF zone for associated mobile nodes. Each context-aware-capable mobile node accordingly creates a context map that at least in part enables determination of the mobile node's next change in static node association and the preferred timing for the change.

DETAILED DESCRIPTION

Figure 1A:
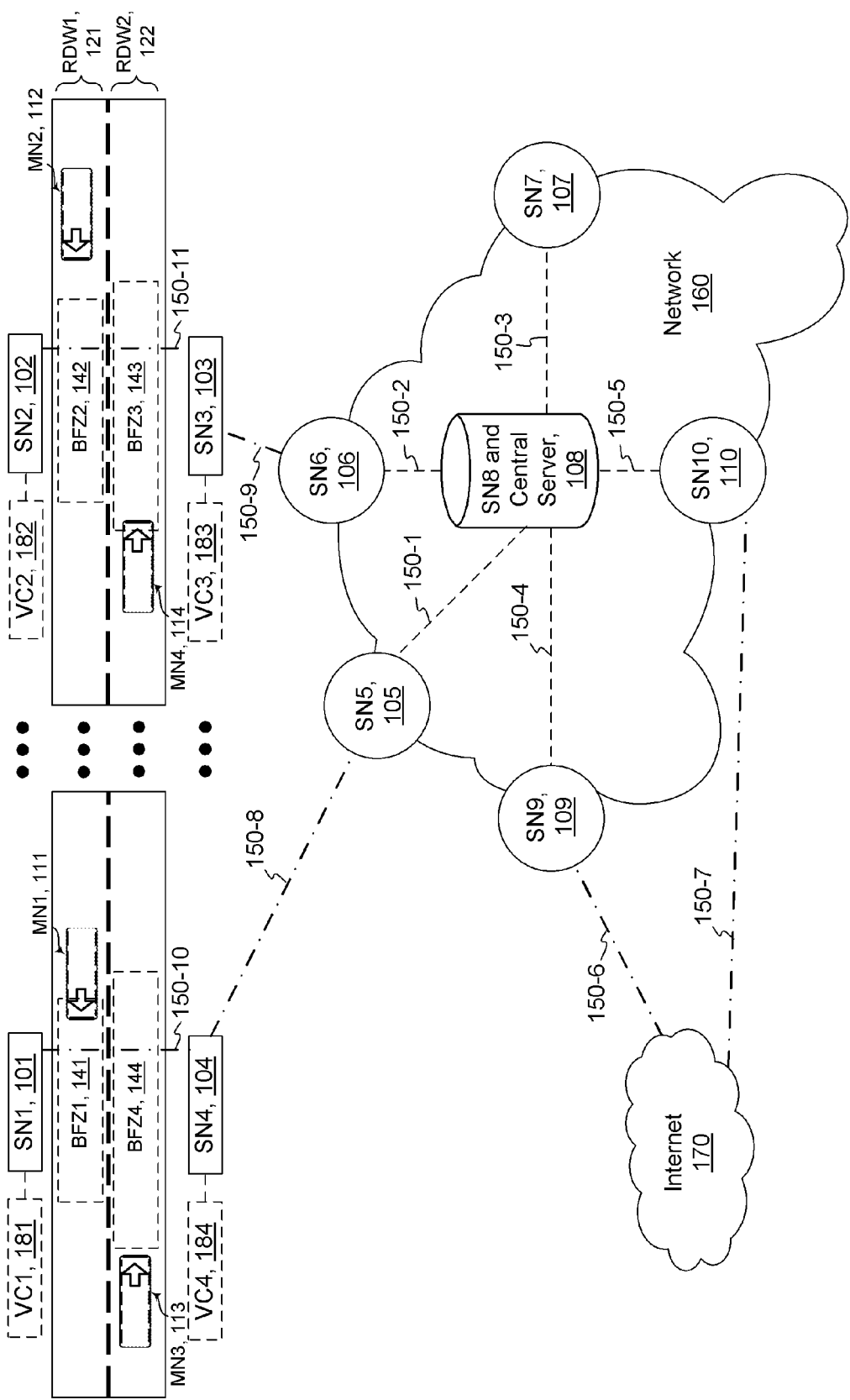
FIGS. 1a and 1b are plan views of illustrative predetermined path embodiments, respectively for roadways and railways.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

A wireless network infrastructure, comprising static and roaming mobile nodes (including one or more types of access-points, a.k.a. AP), avoids unnecessary handoffs and unstable RF regions, and enables at least selected context-aware-capable mobile nodes (a.k.a. mobile units) to provide context-aware services to connected clients. More particularly, each of at least selected static nodes (a.k.a. static units) is enabled to provide the context-aware-capable mobile nodes with context information (a.k.a. "roaming meta data") regarding the static node's location and heading (relative position and direction with respect to the mobile node), details of information served by the static node, special flags (a.k.a. "markers") providing advance indication of relevant impending changes in the foregoing parameters, and a range of signal strength values defining a stable RF zone for associated mobile nodes.

In some embodiments, the static node provided context information further includes one or more resource utilization metrics of the static node (such as one or more of computing, memory, and network loading). According to various embodiments, the mobile node independently locally establishes additional context information, such as one or more of: a GPS determined location of the mobile node, an administrator configured location of the mobile node within a conveyance (such as at a particular end of the conveyance, or at a distance-offset with respect to a particular end), and an administrator configured preference for a particular radio (with its respective antenna type, placement, and orientation) of a plurality of radios of the mobile node. According to various embodiments, the preference for a particular radio is one of a static preference, or a dynamic preference in accordance with a predetermined criteria (such as a function of the direction in which the conveyance is determined to be traveling).

The context information, however established, enables the context-aware mobile node to make the best possible decision regarding its next access-point handoff, to eliminate bad handoffs, and also to provide location and/or direction aware services to clients connected to the context-aware mobile node. The static node provided location and heading context information enable the context-aware mobile node to be location aware, to continue to make optimum handoff decisions, and to continue to provide location/direction services, even in regions where GPS service is not available and/or unreliable (such as tunnels and in underground rail links, where wireless-enabled), and in embodiments without GPS. The static node provided resource utilization context information enables the context-aware mobile node to prefer attachment to a static node that is not overloaded, other factors being equal.

Based on the information obtained from the static nodes in its vicinity, their signal strengths, and its own history of previous associations, each context-aware-capable mobile node creates a context map with its relative position, direction of motion, and any impending changes that might affect its operation and updates this map periodically. The context map at least in part enables determination of the context-aware mobile node's next change in static node association and the preferred timing for same. The context map enables the mobile node to optimally associate with the minimum possible number of static units for a given path of movement. This is desirable to minimize handoffs and the losses arising therein, avoid the Ping-Pong effect (described in the background section), and provide access to information via the static units in a sequential, ordered manner, such as video streams from cameras placed along a road or railway track.

The embodiments herein are generally described wherein the static nodes (a.k.a. static units) are referred to as "access-points", while the mobile nodes (a.k.a. mobile units) are not explicitly described as access-points. Nevertheless, it will be understood that according to various embodiments, one or more client nodes traveling with each mobile node communicate with the mobile node in an ad hoc mode (peer-to-peer), or in infrastructure mode (with the mobile node acting as an access-point at least with respect to the client nodes). The mobile nodes that are enabled to be context-aware are referred to as context-aware mobile nodes. In various embodiments it is preferred, but not required, that all of the mobile nodes in a mesh network are context-aware mobile nodes. It is also understood, that from the perspective of the static access-points, the mobile nodes may be viewed as clients.

According to various embodiments, at least some of the static nodes act as a gateway to one or more of a fixed backbone, intranet, wide area network, and the Internet. Further according to various embodiments, at least some of the static nodes provide associated mobile nodes with access to respective information streams, such as a respective video camera connected to the static node.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A wireless mobile node, comprising:
  means for automatically capturing and interpreting roaming meta-data advertised by one or more static access-points in the vicinity of the mobile node;
  means for automatically reconfiguring the mobile node, contingently based on predetermined criteria, to associate with a next access-point of an ordered list communicated via the roaming meta-data; and
  wherein the mobile node and the static access-points are respective nodes of a wireless mesh network.

EC2) The wireless mobile node of EC1, further comprising:
  means for automatically evaluating whether the signal strength observed for a currently associated access-point is within a predetermined signal strength range communicated via the roaming meta-data; and
  wherein the predetermined criteria for the reconfiguring is a function of at least that the observed signal strength exceeds the predetermined signal strength range.

EC3) The wireless mobile node of EC1, further comprising:
  means for automatically determining whether the mobile node has encountered a marker communicated via the roaming meta-data; and
  wherein the predetermined criteria for the reconfiguring is a function of at least the marker encounter determination.

EC4) The wireless mobile node of EC1, further comprising:
  means for automatically determining a Fresnel zone status; and
  wherein the predetermined criteria for the reconfiguring is a function of at least the Fresnel zone status.

EC5) The wireless mobile node of EC1, further comprising:
  means for automatically determining location and direction of movement based on the roaming meta-data.

EC6) A wireless mobile node of EC1, wherein the roaming meta-data is embedded in one or more Information Elements (IEs) of beacon frames of the static access-point.

EC7) The wireless mobile node of EC1, wherein the mobile node is compatible with at least one revision of the IEEE 802.11 standard.

EC8) The wireless mobile node of EC2 wherein the mobile node is enabled for travel via a conveyance that nominally travels a predetermined path along a transportation corridor.

EC9) The wireless mobile node of EC8 wherein the mobile node is a mobile access-point enabled to provide context-based services to mobile clients associated with the mobile node.

EC10) The wireless mobile node of EC9 wherein the context-based services include video streamed from the static access-point currently associated with the mobile node.

EC11) The wireless mobile node of EC9 wherein the mobile nodes and any mobile clients are provided connectivity to a fixed backbone via the associated static access-point.

EC12) The wireless mobile node of EC8 wherein overall data throughput observed by the mobile node is increased by minimizing packet losses attributable to unstable RF regions and eliminating unnecessary handoffs to non-optimal access-points.

EC13) The wireless mobile node of EC8 wherein the predetermined criteria for the reconfiguring comprises a context map created and periodically updated by the mobile node based on the current signal strength, history of past associations, and advertised roaming meta-data, of static access-points in the vicinity of the mobile node.

EC14) The wireless mobile node of EC13 wherein the context map is further used to determine the timing at which the mobile node disassociates with a given static access-point of the static access-points.

EC15) The wireless mobile node of EC13 wherein the the context map is further used to determine the timing at which the mobile node is enabled to associate with a given static access-point of the static access-points.

EC16) A wireless mesh network, comprising:
  means for identifying an ordering of static node access-points of the wireless mesh network;
  means for delivering the ordering to mobile nodes of the wireless mesh network;
  means for determining the best next static node access-point, of the static node access-points, for each mobile node to roam to; and
  wherein handoffs of the mobile nodes between the static node access-points contrary to the ordering are eliminated.

EC17) A computer readable medium having a set of instructions stored therein that when executed by a processing element cause the processing element to perform operations comprising:
  automatically capturing and interpreting roaming meta-data advertised by one or more wireless static access-points in the vicinity of a wireless mobile node;
  automatically reconfiguring the wireless mobile node, contingently based on predetermined criteria, to associate with a best next wireless static access-point of the wireless static access-points based on an ordered list communicated via the roaming meta-data;
  automatically evaluating whether the signal strength observed for a currently associated wireless static access-point is within a predetermined signal strength range communicated via the roaming meta-data;
  automatically determining the timing at which the wireless mobile node is enabled to associate with, and is required to disassociate from, a given wireless static access-point of the wireless static access-points;
  automatically determining whether the wireless mobile node has encountered a marker communicated via the roaming meta-data;
  automatically determining location and direction of movement of the wireless mobile node based on the roaming meta-data; and
  wherein the wireless mobile node and the wireless static access-points are respective nodes of a wireless mesh network.

EC18) A method comprising:
  automatically capturing and interpreting roaming meta-data advertised by one or more wireless static access-points in the vicinity of a wireless mobile node; and
  automatically reconfiguring the wireless mobile node, in response to predetermined criteria and based on an ordered list communicated via the roaming meta-data, to associate with a best next wireless static access-point of the wireless static access-points; and wherein the wireless mobile node and the wireless static access-points are respective nodes of a wireless mesh network.

EC19) The method of EC18, further comprising:

automatically evaluating whether the signal strength observed for a currently associated access-point is within a predetermined signal strength range communicated via the roaming meta-data; and wherein the predetermined criteria for the reconfiguring is a function of at least that the observed signal strength exceeds the predetermined signal strength range.

EC20) The method of EC18, further comprising:

automatically determining whether the mobile node has encountered a marker communicated via the roaming meta-data; and wherein the predetermined criteria for the reconfiguring is a function of at least the marker encounter determination.

EC21) The method of EC18, wherein the predetermined criteria for the reconfiguring comprises a context map created and periodically updated by the mobile node based on the current signal strength, history of past associations, and advertised roaming meta-data, of static access-points in the vicinity of the mobile node.

EC22) The method of EC21, wherein the context map is further used to determine the timing at which the mobile node disassociates with a given static access-point of the static access-points.

EC23) The method of EC21, wherein the context map is further used to determine the timing at which the mobile node is enabled to associate with a given static access-point of the static access-points.

EC24) The method of EC18, further comprising:

automatically determining a Fresnel zone status; and wherein the predetermined criteria for the reconfiguring is a function of at least the Fresnel zone status and overall data throughput observed by the mobile node is increased by minimizing packet losses attributable to unstable RF regions and eliminating unnecessary hand-offs to non-optimal access-points.

EC25) The method of EC18, further comprising:

automatically determining location and direction of movement based on the roaming meta-data; and wherein the mobile node is a mobile access-point enabled to provide context-based services to mobile clients associated with the mobile node.

EC26) The method of EC25, wherein the mobile node is enabled to perform the reconfiguring and provide the context-based services in wireless-enabled regions without requiring a clear view of the sky.

EC27) The method of EC21, wherein the context map further includes context information established by the mobile node independently from context information provided by the static access-points.

EC28) The method of EC27, wherein the context information established by the mobile node comprises one or more of a GPS determined location of the mobile node, an administrator configured location of the mobile node within a conveyance, an administrator configured preference for a particular radio of a plurality of radios of the mobile node, and a computed result of a predetermined function.

EC29) The method of EC21, wherein the static access-point advertised roaming-data comprises one or more of: the static node's relative position and direction with respect to the mobile node, details of information served by the static node, advance indication of impending changes, a range of signal strength values defining a stable RF zone with respect to the mobile node, and at least one resource utilization metric of the static node.

EC30) The method of EC18, wherein the roaming meta-data is embedded in one or more 802.11 management frames of the static access-point.

MOBILE WIRELESS ROAMING OPTIMAL ASSOCIATIONS

Various embodiments provide for the configuration of a signal strength range on a per static node access-point basis, so as to enable each context-aware mobile node to optimally decide when to associate and later disassociate with an access-point. This is done using a pair of signal strength values <Rmin, Rmax>. Rmin specifies a minimum signal strength threshold value to enable association with the access-point. For signal strength below Rmin, the mobile unit will not associate with the access-point. Rmax specifies a maximum signal strength threshold value beyond which association with the access-point is undesirable. For signal strength above Rmax (and associated with short paths), it is desirable for the mobile unit to automatically disassociate from the access-point corresponding to the signal above Rmax and associate with the best next access-point, even though the best next access-point has a lower signal strength than the current access-point (and is likely farther away than the current access-point).

In at least some context-aware embodiments, signal strengths correspond to a Received Signal Strength Indicator (RSSI), and an RSSI above Rmax (a.k.a. "RSSI-bad") is associated with "bad Fresnel zones" (or simply "bad zones"). The location of the bad zones (associated with destructive interference due to reflections), in terms of RSSI-bad demarcated regions, is generally different for every access-point. While the bad Fresnel zones are to a degree predictable based on the heights of and distances between the antennas of the static and mobile nodes, in at least some embodiments the bad zones are empirically determined via field testing (a.k.a. calibration, mapping, or training) of the mobile nodes.

MOBILE WIRELESS ROAMING ALONG PRE-DETERMINED PATHS

The context-aware roaming techniques taught herein are particularly beneficial in wireless network embodiments where mobile nodes (such as heavy-rail, light-rail, and rapid-transit trains, monorails, maglevs, metros, subways, elevateds, interurbans, trams, people movers, other airport transit, and buses) roam along repeatedly using pre-determined paths, particularly such as found in metropolitan transit deployments. In embodiments involving such pre-determined paths, the infrastructure enables an ordering of the static node access-points and communicating the ordering to the mobile nodes. The mobile nodes are then enabled to use the ordering to determine the best next access-point to roam to and thereby eliminate any unnecessary handoffs (such as ping-ponging) that are not in accordance with the ordering.

In at least some pre-determined path embodiments, there is a single direction looped path, or parallel oppositely directed paths (for example, "outbound" and "inbound"), with a respective set of ordered access-points per path direction. In these embodiments, each mobile node is programmed to only associate with the ordered access-points corresponding to the direction in which the node is traveling (or will be traveling subsequent to a direction reversal indicated by a marker). This enables the use of conventional static node access-points provisioned by administrative management software to broadcast static roaming meta-data.

In a first type of pre-determined path embodiment, the ordering is conveyed via access-point sequence numbers (for example, AP1, AP2, AP3 . . . AP4) included in the roaming meta-data. In a second type of pre-determined path embodiment (not necessarily exclusive of the first type), the ordering is learned by the context-aware mobile nodes, such as via test runs (a.k.a. calibration, mapping, or training runs) over the pre-determined path.

ROAMING META-DATA IMPLEMENTATION

By way of example only, in at least some 802.11 embodiments, the roaming meta-data is broadcast (advertised) via data embedded in Information Elements (IEs) of 802.11 beacon frames. That is, the 802.11 beacon frame IEs are employed to make roaming more efficient. Context-aware mobile nodes will be enabled to absorb the roaming meta-data from the IEs, while conventional mobile clients will simply ignore it. According to various embodiments, the roaming meta-data (context information) is propagated using one or more of a) IEs of 802.11 beacon frames, and b) one or more other 802.11 management frames, such as one or more of probe requests and responses.

Making use of conventional hardware and software for the static node access-points, administrative management software is used to program the access-points to emit the desired roaming meta-data (for example, via the 802.11 beacon frame IEs), which in at least some embodiments is static roaming meta-data, albeit specific (custom configured) to each access-point. That is, the relative position and direction (of the static node with respect to the mobile node), bad zone information, markers, and any other roaming meta-data programmed for broadcast, are respective to each access-point.

Making use of otherwise conventional hardware, the context aware mobile nodes are augmented (such as via a firmware upgrade) to add functionality to capture and decode the roaming meta-data from the static nodes, evaluate in real time various pre-determined decision trees in view of the roaming meta-data and other parametric data (such as RSSI), and dynamically alter their access-point associations accordingly.

PREDETERMINED PATH BASED ROAMING EXAMPLES

Figure 1B:
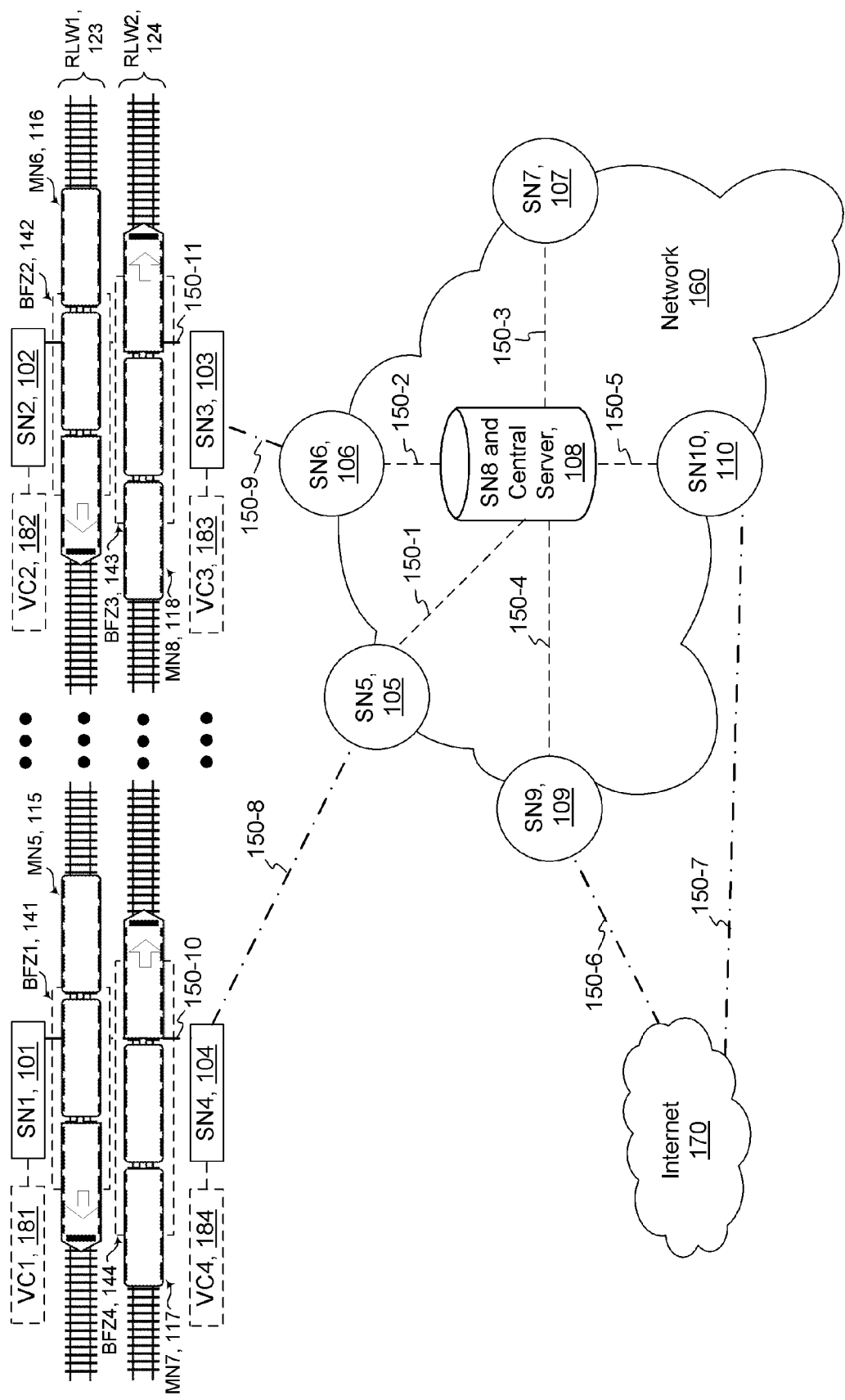

FIG. 1a and FIG. 1b are plan views of illustrative directed path embodiments, respectively for roadway and railway based mobile nodes. Certain features may be more readily discerned in FIG. 1a, due to less visual clutter, but other than specific differences called out, the embodiments are otherwise identical. In FIG. 1a, small segments of two roadways, Roadway RDW1 121 and Roadway RDW2 122, are shown at the top of the drawing. At the top of FIG. 1b, small segments of two railways are shown: Railway RLW1 123 and Railway RLW2 124. The ellipsis in the upper center of each of these drawings is intended to convey that there is a substantive separation distance between the left and right roadway/railway segments. The description that follows directly describes the embodiment of FIG. 1a. Substituting "railways", "Railway", RLW1, RLW2, MN5, MN6, MN7, and MN8, respectively for "roadways", "Roadway", RDW1, RDW2, MN1, MN2, MN3, and MN4, provides a respective description of the embodiment of FIG. 1b. Each mobile node is installed at a chosen location within each conveyance (such as at one of the two ends of a train, or at a distance-offset from one of the ends, determined in view of convenience and engineering economics). In some embodiments, there are multiple mobile nodes within a same conveyance (such as a mobile node located at each end of a train).

As detailed below, mobile nodes MN1, MN2, MN3, and MN4 are traveling on the roadways, and Static Nodes SN1, SN2, SN3, and SN4 are adjacent to the roadways. By way of example, SN1 is statically associated with SN4 (via link 150-10), as is SN2 statically associated with SN3 (via link 150-11). SN3 and SN4 are further associated (with the various links illustrated), respectively with SN6 and SN5, with Network 160, additionally comprising SN7, SN8, SN9, and SN10. SN8 is further designated a central server, used in some embodiments for centralized management and/or storage (such as functions and databases for monitoring, provisioning, authentication, operations logging, and backup) of at least some of the static and mobile nodes. Network 160 is any of a backbone or portion thereof, an intranet, a wide area network, or other network infrastructure supporting a directed path implementation of context-aware roaming. In some embodiments, network 160 is coupled to, or a part of, the Internet 170. The associations given are merely exemplary, and other associations are possible.

At the time corresponding to the illustration, Mobile Nodes MN1 111 and MN2 112 are traveling right-to-left on Roadway RDW1 121. Static Nodes SN1 101 and SN2 102 advertise that they service right-to-left traffic in an ordered sequence (of SN2 followed by SN1), and have respective Bad Fresnel Zones BFZ1 141 and BFZ2 142. Concurrently at the time of the illustration, Mobile Nodes MN3 113 and MN4 114, are traveling left-to-right on Roadway RDW2 122. Static Nodes SN3 103 and SN4 104 advertise that they service left-to-right traffic in an ordered sequence (SN4 followed by SN3), and have respective Bad Fresnel Zones BFZ3 143 and BFZ4 144. The bad Fresnel zones are demarcated by Rmax values respective to and advertised by each static node.

While traveling right-to-left, MN1 and MN2 are programmed to associate only with SN2 and SN1 and in accordance with the sequence numbering advertised by these static nodes. At the time corresponding to the illustration, MN2 is associated with SN2, but will change association to SN1 upon entering into BFZ2, which will be inferred via a detected RSSI value corresponding to the Rmax value advertised for BFZ2. Similarly, while traveling left-to-right, MN3 and MN4 are programmed to associate only with SN3 and SN4 and in accordance with the sequence numbering advertised by these static nodes. At the time of the illustration, MN3 is associated with SN4, but will change association to SN3 upon entering BFZ4, which will be inferred via a detected RSSI value corresponding to the Rmax value advertised for BFZ4.

Each of the static nodes SN1, SN2, SN3, and SN4 is shown optionally coupled respectively to at least video cameras VC1 181, VC2 182, VC3 183, and VC4 184. According to various embodiments, the video cameras provide at least the operators and/or passengers of the mobile nodes associated with the corresponding static nodes, with selected video streams (such as of a transit stop, platform, or surrounding area), providing advance awareness that can promote one or more of safety, security, and efficiency (for example, via showing pedestrian density/traffic flows).

Figure 2:
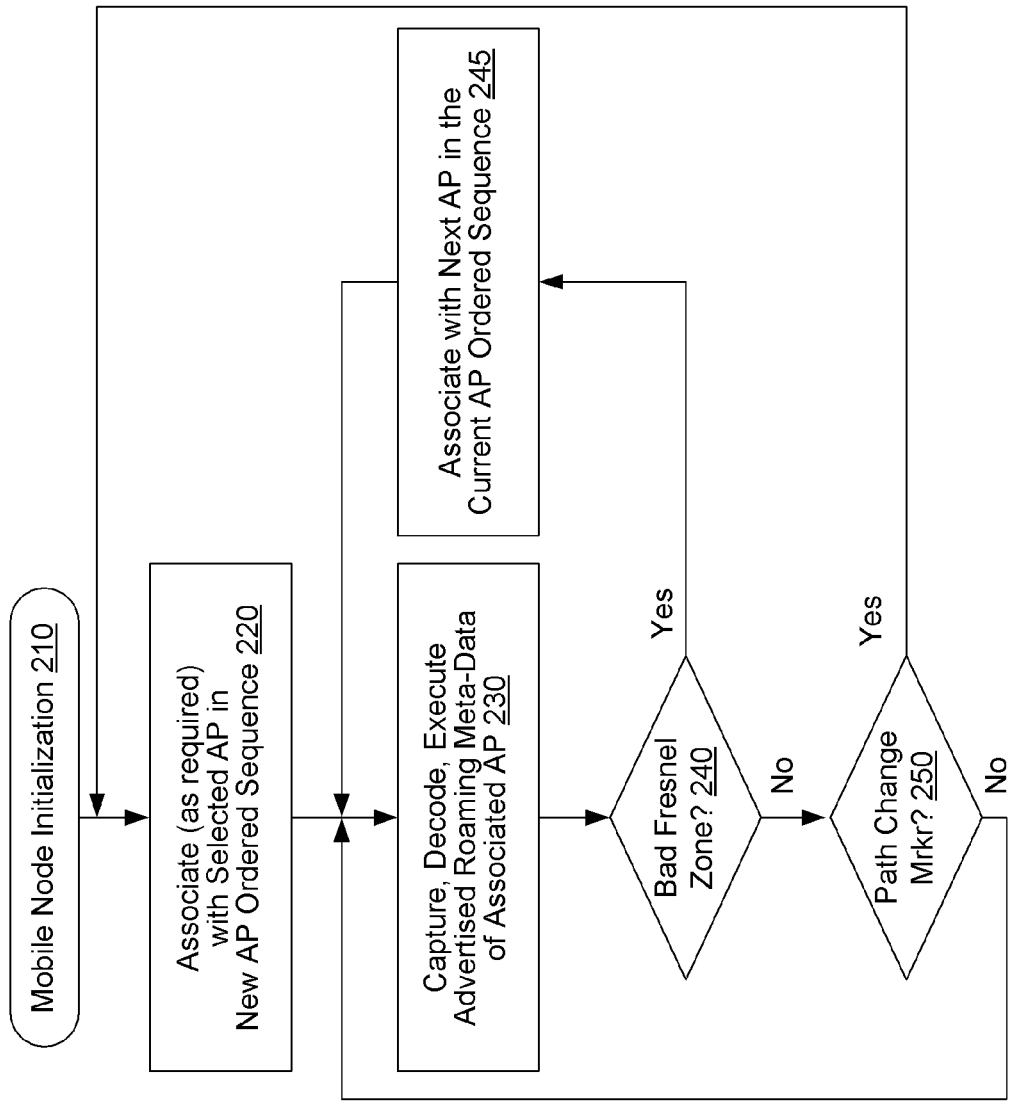
FIG. 2 is a flow chart of an illustrative predetermined path embodiment from the perspective of a mobile node.

FIG. 2 is a flow chart of an illustrative predetermined path embodiment from the perspective of a mobile node. The mobile node (such as any of MN1, MN2, MN3, or MN4, of FIG. 1a or 1b) is initialized in action 210. In action 220, a new ordered sequence of access-points (AP) corresponding to a particular directed path is adopted, and a particular access-point in the ordered sequence is selected and associated with by the mobile node. In action 230, the roaming meta-data being advertised by the currently associated access-point is captured, decoded, and executed (carried out or put in place, as required, where applicable).

Association with the current access-point continues consistent with a periodic assessment of status. In particular, a periodic evaluation is made regarding whether the mobile node has entered a bad Fresnel zone or if a marker (advertised in the roaming meta-data) is detected that signifies a path change (such as a turn-around at an end terminal of the line). The evaluation for a bad Fresnel zone (exemplified by RSSI exceeding Rmax), is represented by decision 240. If the mobile node is in a bad Fresnel zone, in action 245, the mobile node changes association to the next access-point in the current ordered sequence. Assuming the mobile node is not in a bad Fresnel zone, the checking for a path change marker is represented by decision 250. Upon notification of the path change (by confirmation of a respective marker), control flow loops back to carry out action 220 (discussed above). If neither a bad Fresnel zone nor a path change is detected, association with the current access-point continues unchanged, with control flow looping back to carry out action 230 (also as previously discussed).

AP HARDWARE

Figure 3:
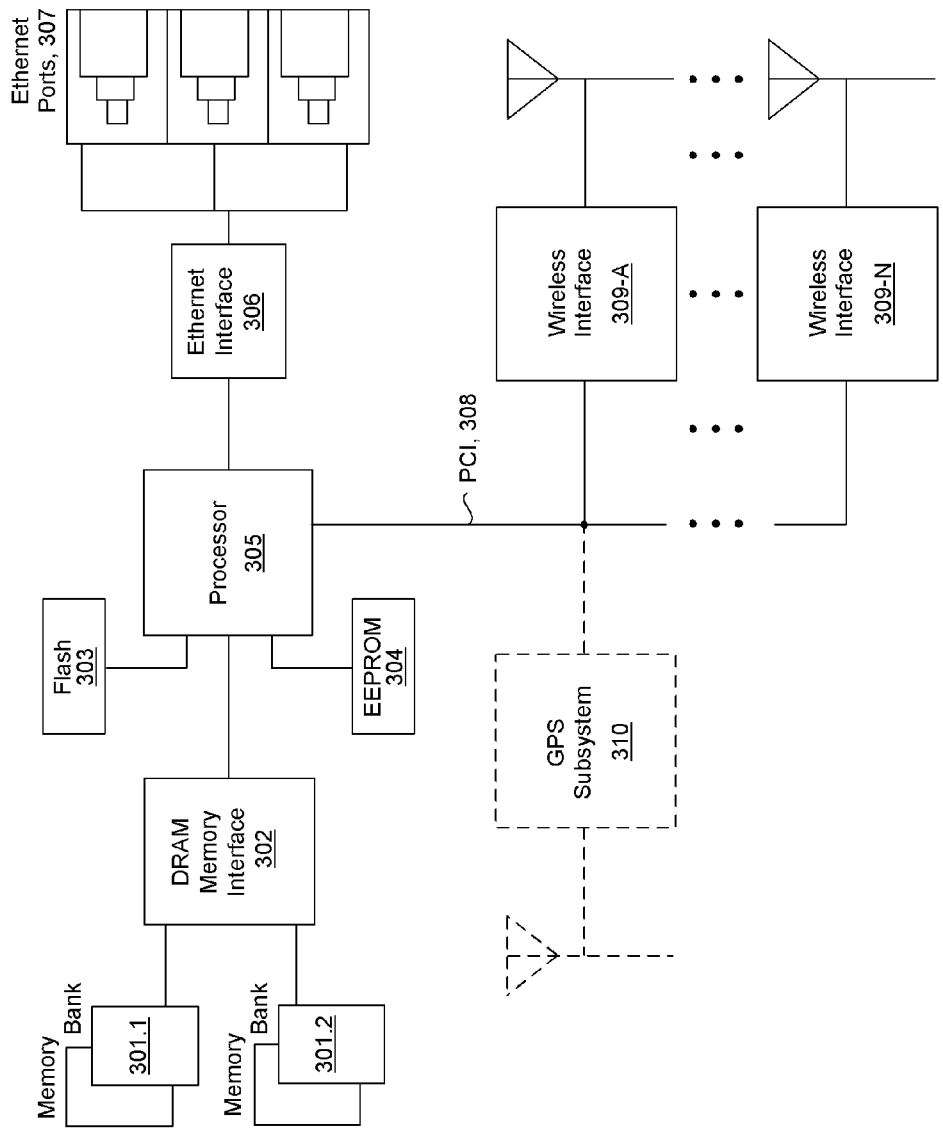
FIG. 3 illustrates selected details of hardware aspects of an embodiment of an access-point (AP).

FIG. 3 illustrates selected details of hardware aspects of an embodiment of an AP, such as any of static or mobile nodes of FIG. 1a or 1b. The illustrated AP includes Processor 305 coupled to various types of storage, including volatile read/write memory "Memory Bank" elements 301.1-2 via DRAM Memory Interface 302, and non-volatile read/write memory Flash 303 and EEPROM 304 elements. According to various embodiments, the processor is further coupled to Ethernet Interface 306 providing a plurality of Ethernet Ports 307 for establishing wired links, and Wireless Interfaces 309-9 and 309-N providing radio communication of packets for establishing wireless links. The wired links provide communication between the illustrated AP and, for example, other APs or a centralized resource. The wireless links provide communication between the illustrated AP and, for example, another AP and/or a client of the illustrated AP. In some embodiments, some of the Wireless Interfaces are compatible with an IEEE 802.11 wireless communication standard (such as any of 802.11a, 802.11b, 802.11g, and 802.11n). In some embodiments, GPS subsystem 310 provides an additional source of location context information. In some embodiments, one or more of the nodes have a plurality of radios with respective antennas of one or more of: a) different type, b) different placement, and c) different administrator configured orientation. By way of example only, in some embodiments, different antennas of the same mobile node are administrator configured to face in opposite directions. The illustrated partitioning is only one example, as other equivalent embodiments of an AP are possible.

In operation, the processor fetches instructions from any combination of the storage elements (such as DRAM, Flash, and EEPROM) that operate as computer readable media, and executes the instructions. Some of the instructions correspond to software associated with operating the mobile nodes to capture, decode, and execute advertised roaming meta-data for context-aware wireless roaming. Some of the instructions correspond to software associated with operating the mobile nodes in accordance with optimal access-point selection in view of bad Fresnel zones. In various embodiments, some of the instructions correspond to software associated with predetermined-path-based roaming. In some embodiments, some of the instructions correspond to all or any portion of software illustrated in FIG. 4, such as NMS Manager 401, Ethernet Driver 414, and Radio Driver 415.

AP SOFTWARE

Figure 4:
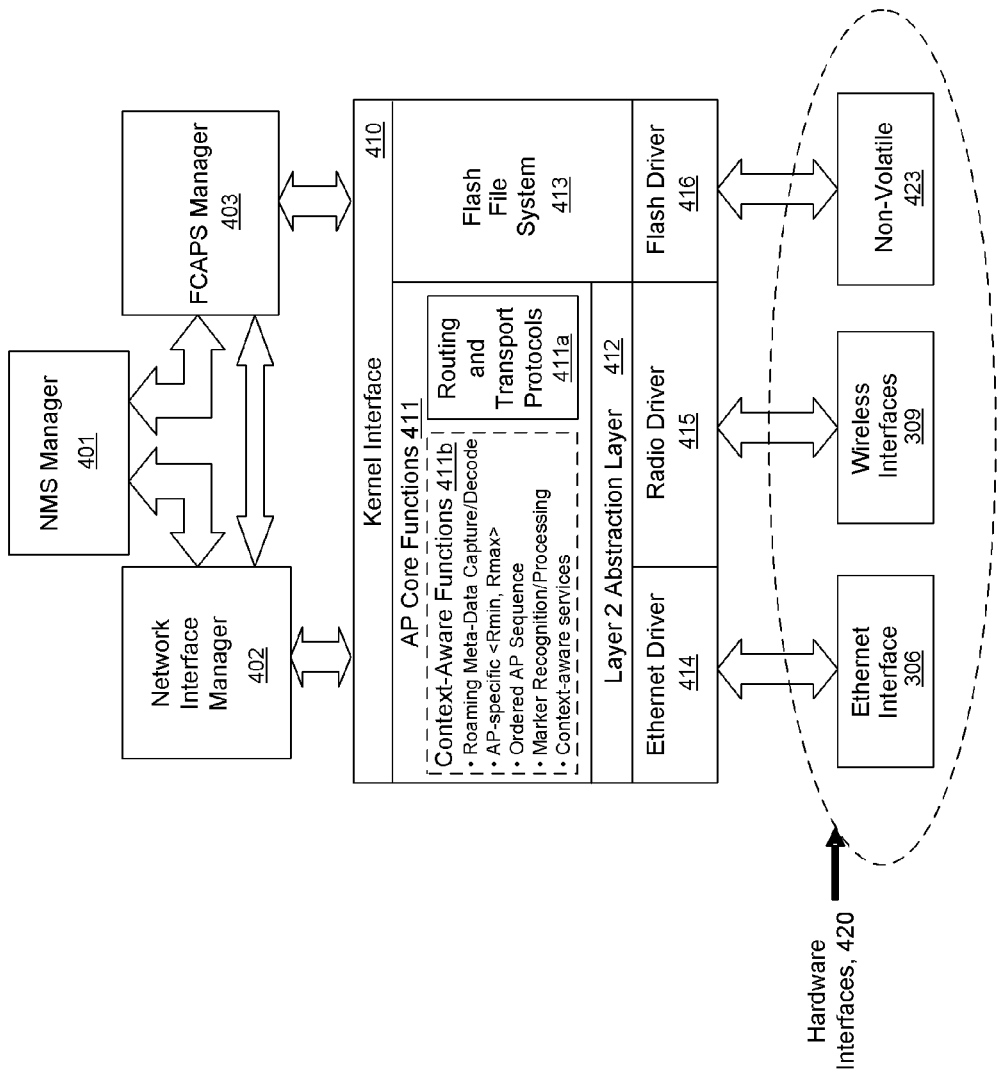
FIG. 4 illustrates selected details of software aspects of an embodiment of an access-point.

FIG. 4 illustrates selected details of software aspects of an embodiment of an AP, such as any of static or mobile nodes of Figs. 1a or 1b, as further qualified below. Various software modules are illustrated in a context that conceptually illustrates AP communication and connectivity capability as Hardware Interfaces 420. The illustrated software includes Network Management System Manager (NMS Manager, a.k.a. NMS) 401 interfacing to Network Interface Manager 402 and Fault, Configuration, Accounting, Performance, and Security Manager (FCAPS Manager, a.k.a. FCAPS) 403. In some embodiments, the NMS Manager interfaces between management software operating external to the AP and software operating internal to the AP (such as various applications and FCAPS). The Network Interface Manager manages physical network interfaces, such as the Ethernet and Wireless Interfaces of an AP, as illustrated by Ethernet Interface 306 (also illustrated in FIG. 3) and Wireless Interfaces 309 (representative of Wireless Interfaces 309-A . . . 309-N of FIG. 3). The Network Interface Manager assists the NMS in passing dynamic configuration changes (as requested by a user) through the management software to FCAPS. In some embodiments, FCAPS includes functions to store and retrieve configuration information, and FCAPS functions serve all applications requiring persistent configuration information. FCAPS optionally assists in collecting fault information and statistics and performance data from various operating modules of the AP. FCAPS selectively passes any portion or all of the collected information, statistics, and data to the NMS.

Kernel Interface 410 interfaces the Managers to AP Core Functions 411 and Flash File System module 413. AP Core Functions 411 includes Routing and Transport Protocols layer 411a, implemented by both static and mobile nodes, and Context-Aware Functions 411b, implemented at least by context-aware mobile nodes. The Transport Protocols include TCP and UDP. In some embodiments, the minimum static node AP core functionality requires no changes from the Routing and Transport Protocols layer 411a found in a conventional AP, the context-aware meta-data being programmable for advertisement (as discussed elsewhere herein) via conventional administrative management software. In some embodiments, the mobile node AP core functionality is implementable via firmware upgrade of a conventional AP to add the Context-Aware Functions 411b. The Context-Aware Functions 411b, comprise capture, decode, and use of the roaming meta-data advertised by selected static nodes. According to various embodiments, the mobile node independently locally establishes additional context information (roaming meta data), such as one or more of: a GPS subsystem determined location of the mobile node, an administrator configured location of the mobile node within a conveyance, and an administrator configured preference for a particular radio (with its respective antenna type, placement, and orientation) of a plurality of radios of the mobile node. Exemplary uses of the roaming meta-data by the mobile nodes (discussed along with other uses in more detail elsewhere herein) include: roaming based on AP-specific <Rmin, Rmax> signal strength thresholds, roaming based on an ordered AP sequence (for example, corresponding to a particular predetermined path), actions based on the recognition of markers (such as adopting a different ordered AP sequence at the end of a transit line), and providing context-aware services (such as location-based services, e.g. video streamed from an upcoming transit stop).

The Flash File System module interfaces to Flash Driver 416 that is illustrated conceptually coupled to Non-Volatile hardware element 423 that is representative of a flash file system (e.g. data organized in a non-volatile memory) stored in any combination of Flash 303 and EEPROM 304 elements of FIG. 3. Layer-2 Abstraction Layer 412 interfaces the Routing and Transport Protocols to Ethernet and Radio Drivers 414 and 415, respectively. The Ethernet Driver is illustrated conceptually coupled to Ethernet Interface 306 of FIG. 3. The Radio Driver is illustrated conceptually coupled to Wireless Interfaces 309 that is representative of the Wireless Interfaces 309-A . . . 309-N of FIG. 3. In some embodiments, the software includes a serial driver. The software is stored on a computer readable medium (e.g. any combination of the DRAM, Flash, and EEPROM elements), and is executed by a programmable element, such as Processor 305 of FIG. 3. The illustrated partitioning is an example only, as many other equivalent arrangements of layers are possible.

In various embodiments, any combination of all or portions of software relating to operating the AP to capture, decode, execute advertised roaming meta-data for context-aware wireless roaming, operating the mobile nodes in accordance with optimal access-point selection in view of bad Fresnel zones, and/or carry out predetermined-path-based roaming, is included in any combination of NMS Manager 401, AP Core Functions 411, Ethernet Driver 414, Radio Driver 415, and other software modules not explicitly illustrated in FIG. 4.

EXAMPLE IMPLEMENTATION TECHNIQUES

In some embodiments, various combinations of all or portions of operations performed by portions of a processor, microprocessor, system-on-a-chip, application-specific-integrated-circuit, hardware accelerator, or other circuitry providing all or portions of the aforementioned AP and context-aware operations, such as the control flow of FIG. 2 and the AP Core Functions 411 of FIG. 4, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Embodiments are thus contemplated wherein any one or more of the context-aware features described elsewhere herein are at least in part implemented in hardware. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    automatically capturing and interpreting roaming meta-data advertised by one or more static access-points in the vicinity of a wireless mobile node;
    automatically reconfiguring the wireless mobile node, in response to predetermined criteria and based on an ordered list communicated via the roaming meta-data, to associate with a best next static access-point of the static access-points, the best next static access-point being a next access-point in the ordered list;
    wherein the wireless mobile node and the static access-points are respective nodes of a wireless mesh network; and
    wherein the predetermined criteria comprises a context map created and periodically updated by the wireless mobile node based on current signal strength, history of past associations, and advertised roaming meta-data, of at least some of the static access-points.

2. The method of claim 1, further comprising automatically determining location and direction of movement based on the roaming meta-data.

3. The method of claim 1, wherein the wireless mobile node is a mobile access-point enabled to provide context-based services to mobile clients associated with the wireless mobile node.

4. The method of claim 1, further comprising:
    automatically determining whether the wireless mobile node has encountered a marker communicated via the roaming meta-data; and
    wherein the predetermined criteria is a function of at least the marker encounter determination.

5. The method of claim 1, wherein the context map is further used to determine when the wireless mobile node disassociates with a given static access-point of the static access-points.

6. The method of claim 1, wherein the context map is further used to determine when the wireless mobile node is enabled to associate with a given static access-point of the static access-points.

7. The method of claim 1, further comprising:
    automatically evaluating whether signal strength observed for a currently associated one of the static access-points is within a predetermined signal strength range communicated via the roaming meta-data; and
    wherein the predetermined criteria is a function of at least that the observed signal strength exceeds the predetermined signal strength range.

8. A non-transitory computer readable medium having a set of instructions stored therein that when executed by a processing element cause the processing element to perform operations comprising:
    automatically capturing and interpreting roaming meta-data advertised by one or more static access-points in the vicinity of a wireless mobile node;
    automatically reconfiguring the wireless mobile node, in response to predetermined criteria and based on an ordered list communicated via the roaming meta-data, to associate with a best next static access-point of the static access-points, the best next static access-point being a next access-point in the ordered list;
    wherein the wireless mobile node and the static access-points are respective nodes of a wireless mesh network; and
    wherein the predetermined criteria comprises a context map created and periodically updated by the wireless mobile node based on current signal strength, history of past associations, and advertised roaming meta-data, of at least some of the static access-points.

9. The non-transitory computer readable medium of claim 8, wherein the operations further comprise automatically determining location and direction of movement based on the roaming meta-data.

10. The non-transitory computer readable medium of claim 8, wherein the wireless mobile node is a mobile access-point enabled to provide context-based services to mobile clients associated with the wireless mobile node.

11. The non-transitory computer readable medium of claim 8, further comprising:
    wherein the operations further comprise automatically determining whether the wireless mobile node has encountered a marker communicated via the roaming meta-data; and
    wherein the predetermined criteria is a function of at least the marker encounter determination.

12. The non-transitory computer readable medium of claim 8, wherein the context map is further used to determine when the wireless mobile node disassociates with a given static access-point of the static access-points.

13. The non-transitory computer readable medium of claim 8, wherein the context map is further used to determine when the wireless mobile node is enabled to associate with a given static access-point of the static access-points.

14. The non-transitory computer readable medium of claim 8, further comprising:
wherein the operations further comprise automatically evaluating whether signal strength observed for a currently associated one of the static access-points is within a predetermined signal strength range communicated via the roaming meta-data; and
wherein the predetermined criteria is a function of at least that the observed signal strength exceeds the predetermined signal strength range.

15. A mobile node, comprising:
means for automatically capturing and interpreting roaming meta-data advertised by one or more static access-points in the vicinity of the mobile node;
means for automatically reconfiguring the mobile node, in response to predetermined criteria and based on an ordered list communicated via the roaming meta-data, to associate with a best next static access-point of the static access-points, the best next static access-point being a next access-point in the ordered list;
wherein the mobile node and the static access-points are respective nodes of a wireless mesh network; and
wherein the predetermined criteria comprises a context map created and periodically updated by the mobile node based on current signal strength, history of past associations, and advertised roaming meta-data, of at least some of the static access-points.

16. The mobile node of claim 15, further comprising means for automatically determining location and direction of movement based on the roaming meta-data.

17. The mobile node of claim 15, wherein the mobile node is a mobile access-point enabled to provide context-based services to mobile clients associated with the mobile node.

18. The mobile node of claim 15, further comprising:
means for automatically determining whether the mobile node has encountered a marker communicated via the roaming meta-data; and
wherein the predetermined criteria is a function of at least the marker encounter determination.

19. The mobile node of claim 15, wherein the context map is further used to determine when the mobile node disassociates with a given static access-point of the static access-points.

20. The mobile node of claim 15, wherein the context map is further used to determine when the mobile node is enabled to associate with a given static access-point of the static access-points.

* * * * *